(12) United States Patent
Tüskes

(10) Patent No.: US 9,457,702 B2
(45) Date of Patent: Oct. 4, 2016

(54) SEAT ASSEMBLY HAVING HEATING ELEMENT PROVIDING ELECTRICAL HEATING OF VARIABLE TEMPERATURE ALONG A PREDETERMINED PATH TO A ZONE

(71) Applicant: KONGSBERG AUTOMOTIVE AB, Mullsjö (SE)

(72) Inventor: Milan Tüskes, München (DE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 0 days.

(21) Appl. No.: 14/760,923

(22) PCT Filed: Jan. 15, 2013

(86) PCT No.: PCT/IB2013/000052
§ 371 (c)(1),
(2) Date: Jul. 14, 2015

(87) PCT Pub. No.: WO2014/111740
PCT Pub. Date: Jul. 24, 2014

(65) Prior Publication Data
US 2016/0016495 A1    Jan. 21, 2016

(51) Int. Cl.
*B60N 2/56* (2006.01)
*H05B 3/34* (2006.01)
*H05B 3/56* (2006.01)

(52) U.S. Cl.
CPC .............. *B60N 2/5685* (2013.01); *H05B 3/34* (2013.01); *H05B 3/56* (2013.01); *H05B 2203/029* (2013.01); *H05B 2203/037* (2013.01)

(58) Field of Classification Search
CPC .... B60N 2/5678; B60N 2/5685; B60N 2/56; A47C 7/748; A47C 7/74
See application file for complete search history.

(56) References Cited

U.S. PATENT DOCUMENTS

| | | | |
|---|---|---|---|
| 1,983,862 A | | 12/1934 | Maness et al. |
| 3,646,322 A | * | 2/1972 | Speekman ............... H05B 3/56 219/222 |
| 3,757,086 A | | 9/1973 | Indoe |

(Continued)

FOREIGN PATENT DOCUMENTS

| | | |
|---|---|---|
| JP | 2003022888 A | 1/2003 |
| WO | WO2005089019 A3 | 11/2005 |

OTHER PUBLICATIONS

English language abstract for WO2005089019, extracted from espacenet.com database on Jul. 14, 2015, 23 pages.

(Continued)

*Primary Examiner* — Philip Gabler
(74) *Attorney, Agent, or Firm* — Howard & Howard Attorneys PLLC

(57) ABSTRACT

A seat assembly is disclosed which has a heating element disposed along a predetermined path in a zone of a bottom seating surface or back seating surface. The heating element provides electrical heating of variable temperature along the predetermined path to the zone. The heating element includes first and second sections continuously alternating along the predetermined path. Each of the first sections provides electrical heating to the zone at a first temperature and each of the second sections provides electrical heating to the zone at a second temperature which is greater than the first temperature.

25 Claims, 6 Drawing Sheets

(56) References Cited

U.S. PATENT DOCUMENTS

| | | | |
|---|---|---|---|
| 4,816,649 A | 3/1989 | Eilentroop | |
| 5,412,181 A * | 5/1995 | Giamati | H05B 3/342 |
| | | | 219/212 |
| 5,422,462 A | 6/1995 | Kishimoto | |
| 5,928,548 A | 7/1999 | Johansson | |
| 6,150,642 A | 11/2000 | Weiss et al. | |
| 6,160,246 A | 12/2000 | Rock et al. | |
| 6,531,687 B2 * | 3/2003 | Michelmann | D04B 21/16 |
| | | | 139/425 R |
| 6,710,313 B1 | 3/2004 | Asami et al. | |
| 7,041,943 B2 | 5/2006 | Michelmann | |
| 7,196,288 B2 * | 3/2007 | Weiss | B60N 2/5685 |
| | | | 219/217 |
| 7,989,703 B2 | 8/2011 | Schaffer | |
| 8,066,324 B2 | 11/2011 | Nathan et al. | |
| 8,544,942 B2 * | 10/2013 | Lazanja | B60N 2/5685 |
| | | | 219/202 |
| 2011/0089161 A1 | 4/2011 | McIver et al. | |
| 2012/0049586 A1 * | 3/2012 | Yoshimoto | A47C 7/748 |
| | | | 297/180.12 |
| 2013/0207422 A1 * | 8/2013 | Potton | B60N 2/5685 |
| | | | 297/180.12 |

OTHER PUBLICATIONS

English language abstract for JP2003022888(A), extracted from espacenet.com database on Jul. 14, 2015, 16 pages.
International Search Report of PCT/IB2013/000052.

* cited by examiner

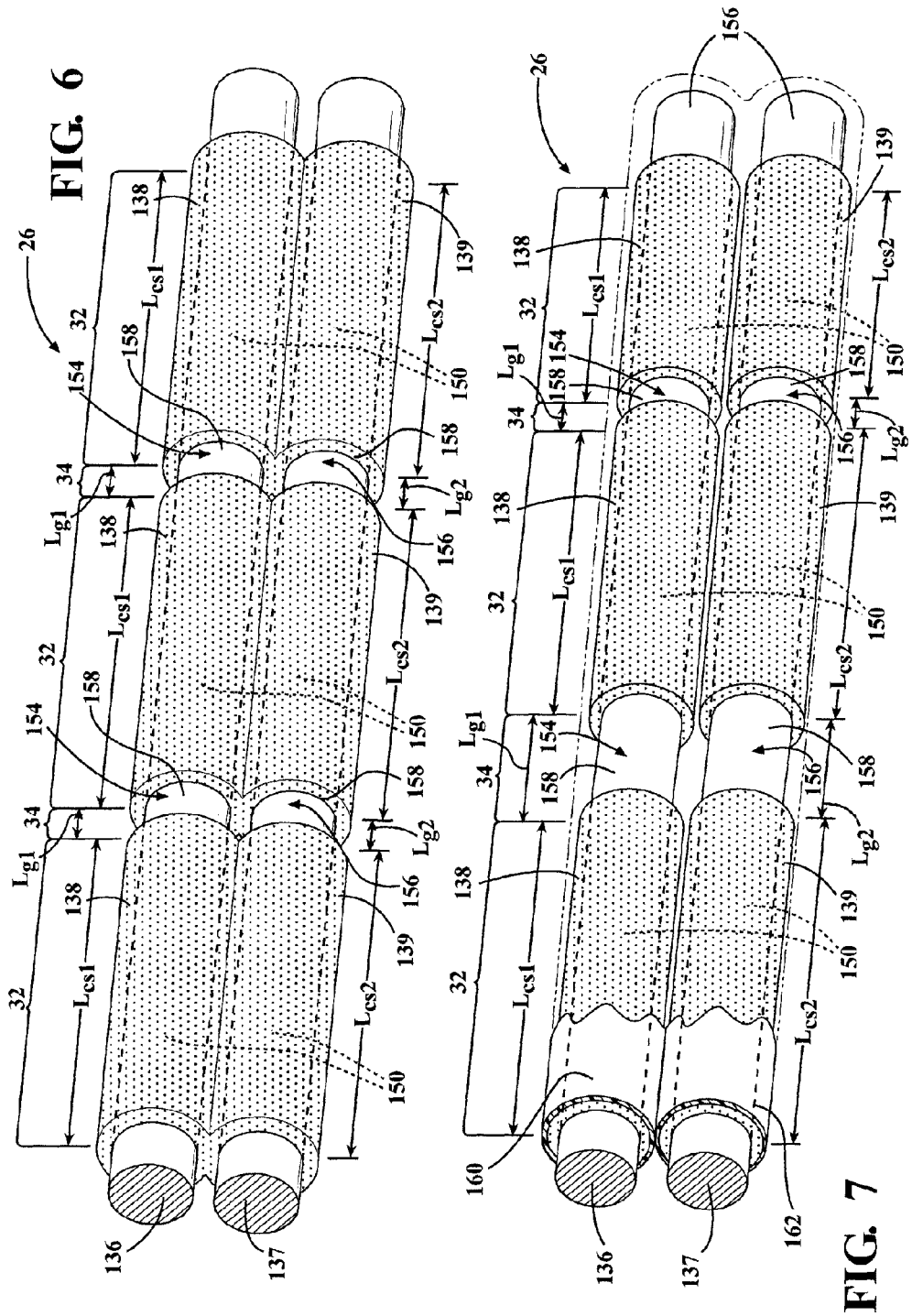

SEAT ASSEMBLY HAVING HEATING ELEMENT PROVIDING ELECTRICAL HEATING OF VARIABLE TEMPERATURE ALONG A PREDETERMINED PATH TO A ZONE

CROSS REFERENCE TO RELATED APPLICATIONS

This application is the U.S. National Stage of International Patent Application No. PCT/IB2013/000052, filed on Jan. 15, 2013, the disclosure of which is hereby incorporated by reference.

BACKGROUND OF THE INVENTION

1. Field of the Invention

The subject invention generally relates to seat assembly having a seating surface with a zone which is temperature controlled, and more specifically, with the heating element disposed in the zone along a predetermined path for providing electrical heating of variable temperature along the predetermined path to the zone.

2. Description of Related Art

Nearly every vehicle today has a seat assembly with a seating surface having a seat back and a seat bottom. Often, the seat back and seat bottom each have a zone which is temperature controlled. A heating element conventionally is disposed along a winding path within the zone for providing electrical heating to the zone. The heating element includes typically one or more heating strands which are electrically conductive. A power source is connected to the heating element for energizing the heating strands such that the heating element generates electrical heating to the zone. Each heating strand has a consistent cross-section throughout the winding path. In addition, the heating element conventionally has a consistent number of heating strands along the winding path such that the heating element provides electrical heating uniformly along the winding path. In other words, the heating element provides a consistent temperature along any point throughout the winding path. In effect, conventional heating elements consume a consistent amount of power per unit length, i.e., per meter.

However, conventional heating elements have a variety of disadvantages. First, conventional heating elements consume a large amount of power. Since conventional heating elements consume a consistent amount of power per unit length, power consumption is maximized along the winding path of the heating element. Second, conventional heating elements can frequently provide discomfort to an occupant of the seat assembly. Between winding portions of the heating element are regions of the seating surface which are less exposed to electrical heating. Conventional heating elements concentrate the electrical heating substantially along the winding path as opposed to the regions of the seating surface between winding portions of the heating element. Therefore, those regions of the seating surface which are less exposed to electrical heating are often cooler than surrounding areas thereby causing a temperature differential, or temperature gap in the region. The occupant senses the temperature gap on the seating surface which, in effect, causes discomfort to the occupant.

Therefore, there remains an opportunity to develop a seat assembly that has a heating element disposed in the zone for providing electrical heating of variable temperature at various points along a predetermined path. In addition, there remains an opportunity to develop a seat assembly that has a heating element which consumes less power than conventional heating elements. Furthermore, there remains an opportunity to develop a seat assembly that has a heating element which avoids causing discomfort to an occupant of the seat assembly by minimizing temperature gaps on the seating surface.

SUMMARY OF THE INVENTION AND ADVANTAGES

The subject invention provides a seat assembly including a seat bottom and a seat back. The seat back is coupled to the seat bottom. The seat bottom has a bottom seating surface and the seat back has a back seating surface. At least one of the bottom seating surface and the back seating surface has a zone which is temperature controlled. A heating element is disposed along a predetermined path in the zone. The heating element is configured to provide electrical heating of variable temperature to the zone along the predetermined path. The heating element includes first and second sections continuously alternating along the predetermined path. Each of the first sections provides electrical heating to the zone at a first temperature. Each of the second sections provides electrical heating to the zone at a second temperature. The second temperature is greater than first temperature.

According to one embodiment, the subject invention further provides the heating element including a continuous strand which extends continually through each of the alternating first and second sections along the predetermined path. The heating element includes a plurality of strand segments. Each of the strand segments defines a strand segment length. Each of the strand segments are electrically connected to the continuous strand. Each of the strand segments are disposed adjacent one another in series along the predetermined path such that each of the first sections includes one of the strand segments and a first portion of the continuous strand extending along the strand segment length. Each of the strand segments are spaced from an adjacent strand segment by a gap defining a gap length. The continuous strand extends across each of the gaps such that each of the second sections includes a second portion of the continuous strand extending across each of the gap lengths.

According to another embodiment, the subject invention further provides the heating element including a first continuous conductor and a second continuous conductor each extending continually through each of the alternating first and second sections along the predetermined path. The heating element includes a plurality of first conductor segments each defining a first conductor segment length. Each of the first conductor segments are electrically connected to the first continuous conductor. Each of the first conductor segments are disposed adjacent one another in series along the predetermined path. The heating element includes a plurality of second conductor segments each defining a second conductor segment length. Each of the second conductor segment are electrically connected to the second continuous conductor and disposed adjacent one another in series along the predetermined path. The first conductor segment lengths are substantially aligned with the second conductor segment lengths along the predetermined path such that each of the first sections includes the aligned first and second conductor segments and a first portion of each of the first and second continuous conductors extending along the aligned first and second conductor segment lengths. Each of the first conductor segments are spaced from an adjacent first conductor segment by a first gap defining a first gap length. Each of the second conductor segments are spaced from an adjacent second conductor segment by a second gap defining a second gap length. The first gap lengths are substantially aligned with the second gap lengths along the predetermined path. Each of the second sections includes a second portion of each of the first and second continuous conductors extending across each of the aligned first and second gap lengths.

In yet another embodiment, the present invention provides an assembly including a vehicular component having at least one zone which is temperature controlled. The heating element is mounted to the vehicular component and disposed along the predetermined path in the zone with the heating element configured to provide electrical heating of variable temperature to the zone along the predetermined path. The heating element includes first and second sections continuously alternating along the predetermined path. Each of the first sections provides electrical heating to the zone at the first temperature. Each of the second sections provides electrical heating to the zone at the second temperature with the second temperature being greater than the first temperature. The heating element includes the continuous conductor which extends continually through each of the alternating first and second sections along the predetermined path. The heating element includes the plurality of conductor segments each defining a conductor segment length and each being electrically connected to the continuous conductor. The plurality of conductor segments are disposed adjacent one another in series along the predetermined path such that each of the first sections includes one of the conductor segments and the first portion of the continuous conductor extending along the conductor segment length. Each of the conductor segments are spaced from the adjacent conductor segment by the gap defining the gap length. The continuous conductor extends across each of the gaps such that each of the second sections includes the second portion of the continuous conductor extending across each of the gap lengths.

Accordingly, the seat assembly provides a heating element disposed in the zone of the seating surface for providing electrical heating of variable temperature along the predetermined path. The heating element consumes less power than conventional heating elements. Specifically, the heating element consumes variable amounts of power per unit length. As such, power consumption is minimized at each of the first sections of the heating element along the predetermined path. Furthermore, the heating element of the seat assembly maximizes power consumption towards enhancing comfort of the occupant. In addition, the heating element minimizes discomfort to the occupant of the seat assembly. By providing variable temperature along the predetermined path, the heating element can concentrate electrical heating to regions of the seating surface which are less exposed to electrical heating, such as those regions between winding portions of the heating element. In effect, the heating element minimizes temperature gaps on the seating surface thereby increasing the comfort of the occupant of the seat assembly.

BRIEF DESCRIPTION OF THE DRAWINGS

Other advantages of the present invention will be readily appreciated as the same becomes better understood by reference to the following detailed description when considered in connection with the accompanying drawings.

FIG. 6 is an enlarged perspective view of a heating element having a first continuous core with first plating segments and a second continuous core with second plating segments which are aligned with the first plating segments, with the first and second plating segments having constant lengths and being spaced by constant gaps according to one embodiment of the present invention.

FIG. 7 is an enlarged perspective view of a heating element with the aligned first and second plating segments having varying lengths and being spaced by varying gaps according to another embodiment of the present invention.

DETAILED DESCRIPTION OF THE INVENTION

Figure 1:
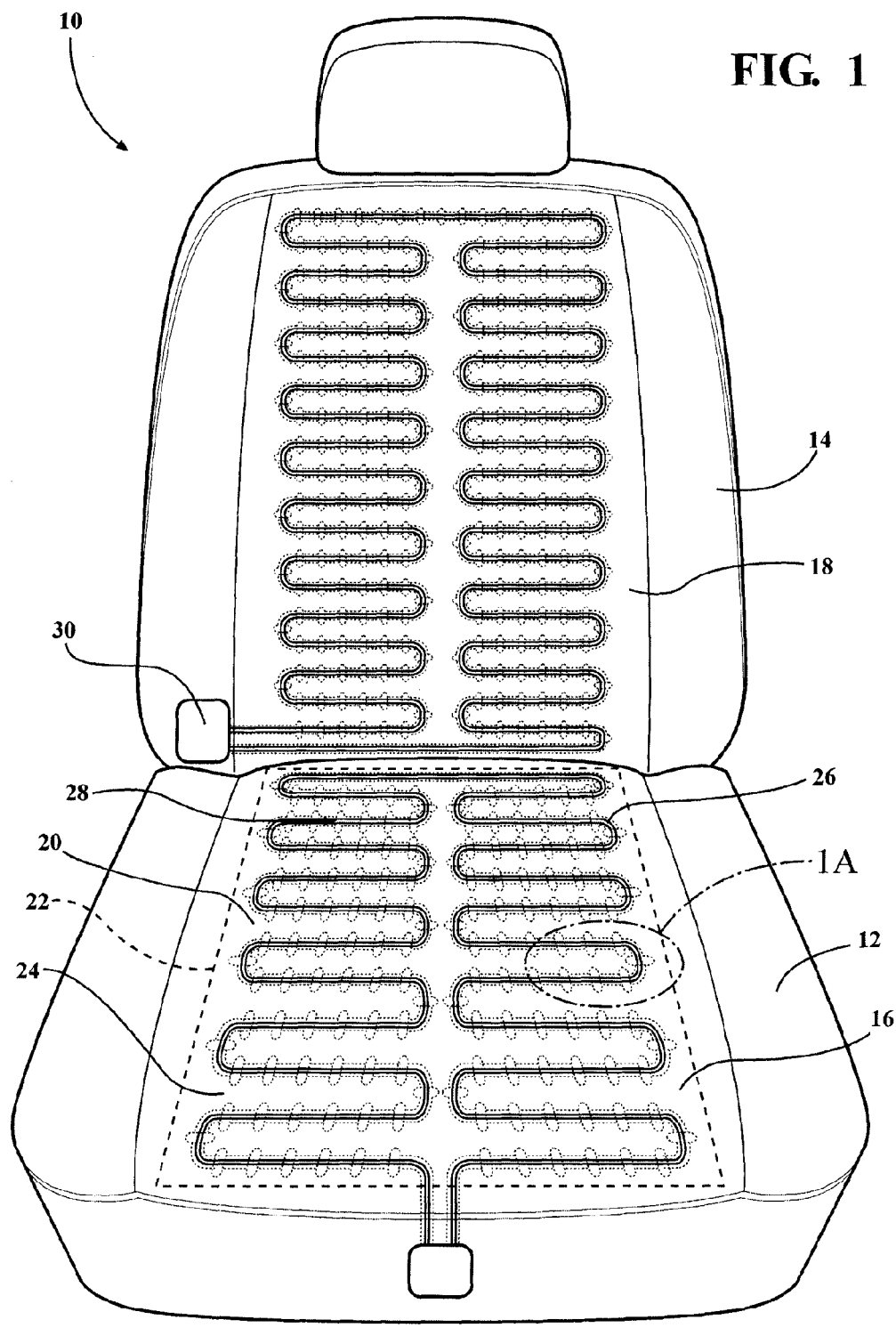
FIG. 1 is a perspective view of a seat assembly including a seat bottom and a seat back coupled to the seat bottom with a heating element disposed along a predetermined path in a zone.

Referring to the Figures, wherein like numerals indicate like or corresponding parts throughout the several views, a vehicular component is generally shown at 10 in FIG. 1. In the embodiment as shown in FIG. 1, the vehicular component is further defined as seat assembly. For simplicity, the vehicular component hereinafter will be described and numbered according to the seat assembly embodiment, as shown in FIG. 1. However, the vehicular component may include any other suitable device in a vehicle which is heated, such as a steering wheel, and the like.

The seat assembly 10 is utilized in a vehicle, such as an automobile. The seat assembly 10 includes a seat bottom 12 and a seat back 14 which is coupled to the seat bottom 12. The seat bottom 12 has a bottom seating surface 16 and the seat back 14 has a back seating surface 18.

The vehicular component has at least one zone 20 which is temperature controlled. In instances where the vehicular component is the seat assembly 10, at least one of the seat bottom 12 and the seat back 14 have the zone 20. In one embodiment, as shown in FIG. 1, the seat bottom 12 and includes the zone 20. In another embodiment, both the seat bottom 12 and the seat back 14 include the zone 20. Each zone 20 defines generally a zone boundary 22 which defines an area 24 of the zone 20.

The seat assembly 10 includes a heating element 26 disposed along a predetermined path 28 in the zone 20. The heating element 26 is configured to provide electrical heating of variable temperature to the zone 20 along the predetermined path 28. The heating element 26 is confined generally within the area of the zone 20. In one embodiment, the heating element 26 is embedded within the seat assembly 10 generally below at least one of the bottom seating surface 16 and back seating surface 18. A power source 30 typically is connected to the heating element 26 for providing power to the heating element 26 such that the heating element 26 provides the electrical heating of variable temperature. Commonly, the power source 30 is a direct current power source, such as a vehicle battery, for supplying electrical current through the heating element 26.

Figure 1A:
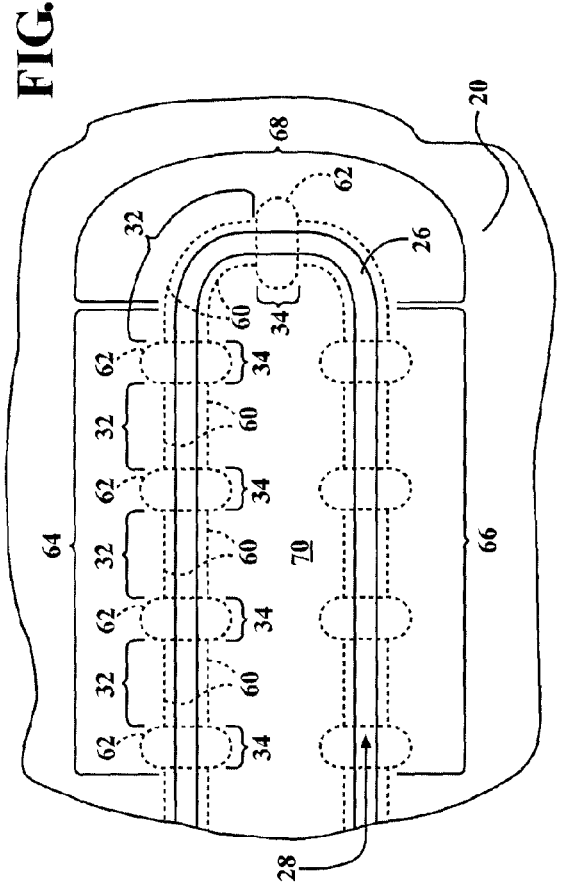
FIG. 1A is an enlarged plan view of the heating element of FIG. 1.

The predetermined path 28 may have any suitable configuration for enabling the heating element 26 to distribute electrical heating to the zone 20. In one embodiment, as shown in FIGS. 1 and 1A the predetermined path 28 is has a winding configuration. More specifically, the predetermined path 28 may have a serpentine configuration. However, the predetermined path 28 may have other configurations, such as a zig-zag configuration, and the like. Furthermore, the heating element 26 may extend any suitable length along the predetermined path 28. In one embodiment, the heating element 26 spans a length of approximately 5 meters.

As illustrated in FIGS. 1 and 1A, the heating element 26 has first sections 32 and second sections 34 which continuously alternate along the predetermined path 28. Specifically, the heating element 26 has a combination of alternating first and second sections 32, 34 disposed adjacent one another along the length of the predetermined path 28. Generally, each of the first sections 32 is sandwiched between two of the second sections 34, and vice-versa. The heating element 26 includes a plurality of first sections 32 and a plurality of second sections 34. Preferably, the heating element 26 includes between 150-200 first sections 32 and between 150-200 second sections 34 along the predetermined path 28.

Each of the first sections 32 of the heating element 26 provides electrical heating to the zone 20 at a first temperature. Each of the second sections 34 of the heating element 26 provides electrical heating to the zone 20 at a second temperature. The second temperature is greater than the first temperature. Generally, each of the second sections 34 provide electrical heating at a greater temperature than each of the first sections 32. In one embodiment, the first temperature is substantially the same for each of the first sections 32 and the second temperature is substantially the same for each of the second section 34. In another embodiment, the first and second temperatures may vary with respect to specific ranges. In particular, the first temperature may be further defined as being within a first temperature range and the second temperature may be further defined as being within a second temperature range. The first temperature range defines a first range minimum and a first range maximum. The second temperature range defines a second range minimum and a second range maximum. According to this embodiment, the second range minimum is greater than the first range maximum. In other words, the lowest temperature provided from among the second sections 34 is greater than the highest temperature provided from among the first sections 32. However, other relationships between the first temperature and the second temperature may be realized without departing from the scope of the present invention.

As illustrated in FIGS. 2-5, the heating element 26 includes a continuous strand 36 which extends continually through each of the alternating first and second sections 32, 34 along the predetermined path 28. The continuous strand 36 includes a conductive material such that the continuous strand 36 is electrically conductive. The conductive material may be copper, copper alloy, stainless steel, and the like. Furthermore, the continuous strand 36 may include any suitable plating including conductive material, such as copper or silver. The continuous strand 36 typically is integrally formed and uninterrupted along the predetermined path 28. In one embodiment, the continuous strand 36 has a cross-sectional area which is consistent along the predetermined path 28. Specifically, in the embodiment as shown in FIGS. 2-5, the cross-sectional area of the continuous strand 36 has a circular configuration. Thus, in such embodiments, the continuous strand 36 has a configuration which is generally consistent with the term "strand" as used in the art. Furthermore, the continuous strand 36 preferably has an electrical resistance per unit length which is consistent along the predetermined path 28. For instance, the electrical resistance per unit length of the continuous strand 36 may be 10 Ohms/meter. It is to be appreciated that the heating element 26 may include a bundle of more than one continuous strand 36 extending continually through each of the alternating first and second sections 32, 34.

Figure 3:
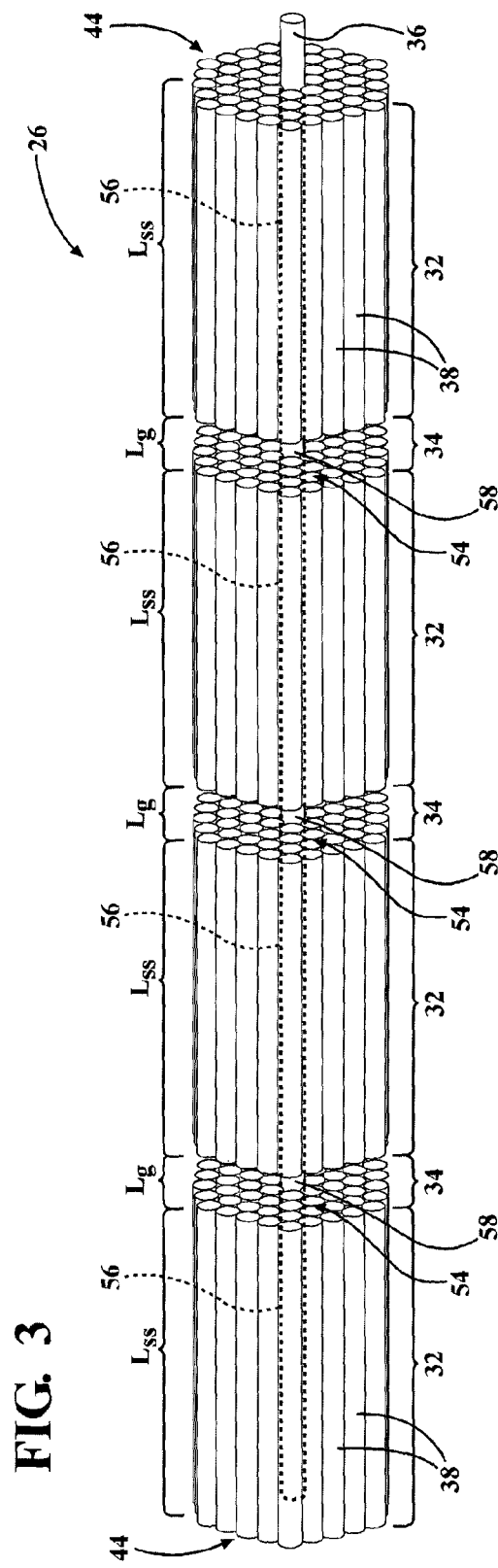
FIG. 3 is an enlarged perspective view of a heating element having the continuous strand surrounded by strand segment groupings with strand segments having constant lengths and being spaced by constant gaps according to another embodiment of the present invention.

The heating element 26 further includes a plurality of strand segments 38 which are electrically connected to the continuous strand 36. Each of the strand segments 38 defines a strand segment length $L_{SS}$. More specifically, each of the strand segments 38 has a first end 40 and a second end 42 and the strand segment length $L_{SS}$ is defined between the first and second ends 40, 42. In one embodiment, as shown in FIG. 3, each of the strand segment lengths $L_{SS}$ are substantially constant along the predetermined path 28. In another embodiment, as shown in FIG. 4, at least one of the strand segment lengths $L_{SS}$ is different than another one of the segment lengths $L_{SS}$ along the predetermined path 28.

In one embodiment as shown in FIGS. 2-5, each of the strand segments 38 is disposed substantially parallel to the continuous strand 36. Generally, each of the strand segments 38 directly abuts at least another strand segment 38 and/or the continuous strand 36. The strand segments 38 may be coupled to each other and/or to the continuous strand 36. The strand segments 38 may be coupled to each other and/or the continuous strand 36 according to any suitable method, such as soldering, bundling, crimping, and the like.

Figure 2:
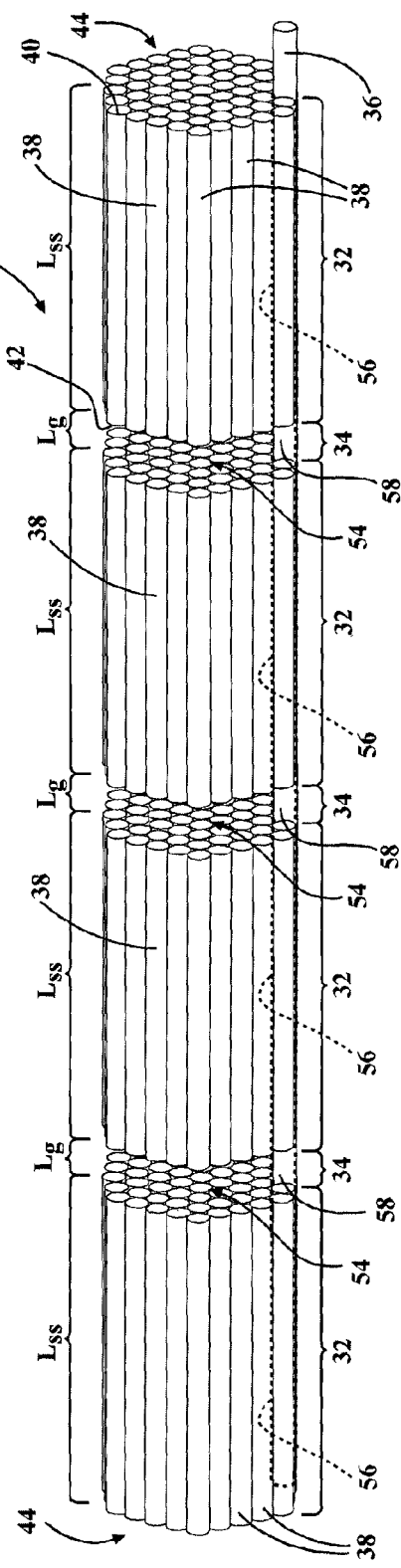
FIG. 2 is an enlarged perspective view of a heating element having a continuous strand and a plurality of strand segments according to one embodiment of the present invention.
Figure 4:
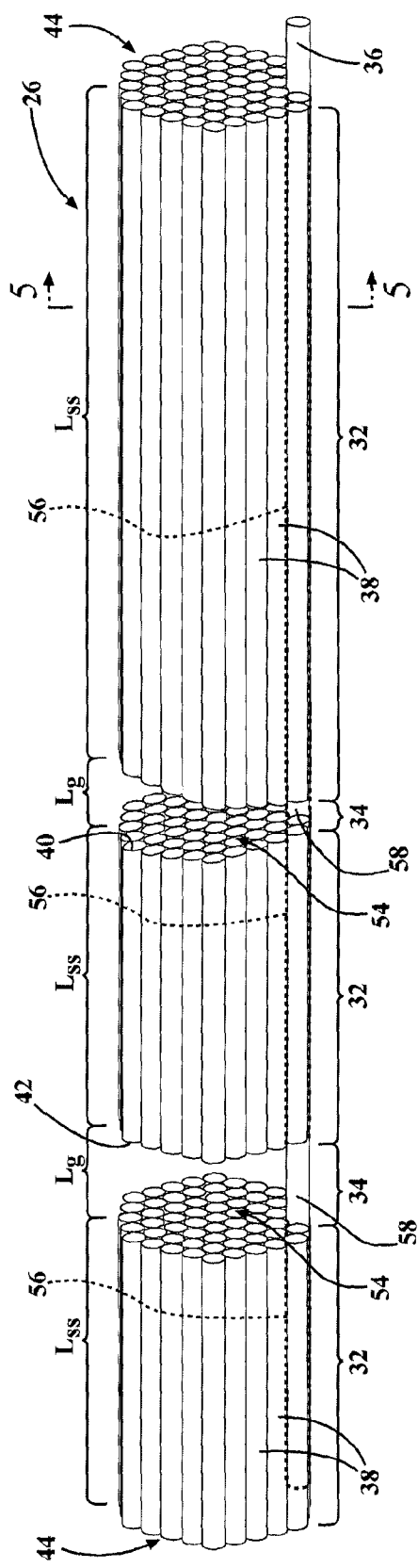
FIG. 4 is an enlarged perspective view of a heating element having the continuous strand disposed at the periphery of the strand segment groupings with strand segments having varying lengths and being spaced by varying gaps according to yet another embodiment of the present invention.
Figure 5:
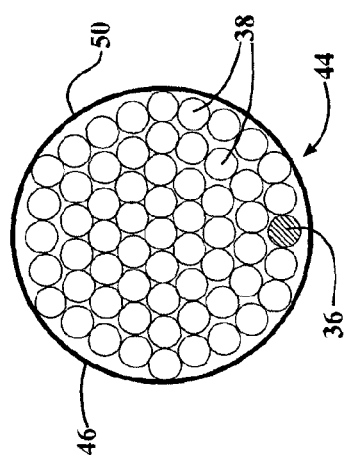
FIG. 5 is a cross-sectional area of one of the strand segment groupings of FIG. 4.

As shown in FIGS. 2-4, the strand segments 38 in at least one of the first sections 32 may be arranged in a strand segment grouping 44. Each of the strand segments 38 in the strand segment grouping 44 is substantially aligned along the predetermined path 28. As shown in FIG. 5, the strand segment grouping 44 has a cross-sectional area 46 defining a periphery 50. In one embodiment, as shown in FIG. 5, the cross-sectional area 46 of the strand segment grouping 44 has a substantially circular configuration. However, the cross-sectional area 46 may have other configurations, such as a rectangular configuration, of the like. In FIGS. 2 and 5, the continuous strand 36 is disposed substantially at the periphery 50 of the cross-sectional area 46 of each of the strand segment groupings 44. In another embodiment, as shown in FIGS. 3 and 4, the continuous strand 36 is disposed within the periphery 50 of the cross-sectional area 46 of each of the strand segment groupings 44. In other words, the continuous strand 36 is substantially surrounded by the strand segment grouping 44. For example, as shown in FIG. 3, the continuous strand 36 may be disposed substantially at a center of the cross-sectional area 46 of each of the strand segment groupings 44. The continuous strand 36 may further be disposed at the periphery 50 of the cross-sectional area 46 of at least one strand segment groupings 44 while simultaneously being disposed within the periphery 50 of the cross-sectional area 46 of at least another one of the strand segment groupings 44. It is to be appreciated that the strand segment groupings 44 may configured with respect to the continuous strand 36 according to other configuration not specifically described herein. For example, the strand segment groupings 44 may be wound around the continuous strand 36 without departing from the scope of the invention.

The strand segments 38 include a conductive material such that the strand segments 38 are electrically conductive. The conductive material may be copper, copper alloy, stainless steel, and the like. Furthermore, the strand segments 38 may include any suitable plating which includes conductive material. Each of the strand segments 38 may be integrally formed. Each of the strand segments 38 has a cross-sectional area. In one embodiment, the cross-sectional area of each of the strand segments 38 is substantially similar. As shown in FIGS. 2-5, the strand segments 38 each have a cross-sectional area having a circular configuration. In such embodiments, the strand segments 38 have a configuration which is generally consistent with the term "strand" as used in the art. Furthermore, the strand segments 38 each preferably have a substantially similar electrical resistance per unit length. Preferably, the electrical resistance per unit length of the strand segments 38 is lower than the electrical resistance per unit length of the continuous strand 36.

The strand segments 38 are disposed adjacent one another in series along the predetermined path 28. As shown in FIGS. 2-5, each of the strand segments 38 are spaced from an adjacent strand segment 38 by a gap 54. The first and second ends 40, 42 of each of the strand segments 38 are spaced from the first and second ends 40, 42 of a respective one of the adjacent strand segments 38 by one of the gaps 54. Each of the gaps 54 is defined by a gap length $L_g$. The gap length $L_g$ is defined between one of the first and second ends 40, 42 of one of the strand segments 38 and one of the first and second ends 40, 42 of an adjacent strand segment 38.

The continuous strand 36 extends across each of the gaps 54. In one embodiment, as shown in FIGS. 2 and 3, the gap lengths $L_g$ are substantially constant along the predetermined path 28. In other words, each of the gap lengths $L_g$ has substantially the same length. In another embodiment, as shown in FIG. 4, at least one of the gap lengths $L_g$ is different than another one of the gap lengths $L_g$ along the predetermined path 28. Preferably, each of the gap lengths $L_g$ is defined in a range between 1 mm to 5 mm.

The gap length $L_g$ may vary slightly between adjacent strand segments 38 such that each of the adjacent strand segments 38 are unequally spaced by one of the gaps 54. For example, as shown in FIG. 4, the adjacent strand segments 38 may be spaced from one another in a tapered configuration such that the gap 54 has a V-shaped.

As shown in FIGS. 2-4, each of the first sections 32 includes one of the strand segments 38 and a first portion 56 of the continuous strand 36 extending along the strand segment length $L_{SS}$. Each of the first sections 32 includes a combination of the first portion 56 of the continuous strand 36 and the corresponding strand segment or segments 38 which are disposed adjacent to and electrically connected to the first portion 56 of the continuous strand 36. Thus, each of the first portions 56 extends along the predetermined path 28 according to one of the strand segment length $L_{SS}$. In one embodiment, as shown in FIGS. 2-4, each of the first sections 32 includes a plurality of strand segments 38. Alternatively, each of the first sections 32 may include at least one of the strand segments 38. Furthermore, each of the first sections 32 preferably includes a common number of the strand segments 38.

In instances, where the strand segments 38 belonging to one of the strand segment groupings 44 have various strand segment lengths $L_{SS}$, such as shown in FIG. 4, the first portion 56 may be defined according to the strand segment length $L_{SS}$ corresponding to a shortest or a longest one of the strand segments 38.

The continuous strand 36 extends across each of the gaps 54 such that each of the second sections 34 includes a second portion 58 of the continuous strand 36 extending across each of the gap lengths $L_g$. Each of the second sections 34 includes the second portion 58 of the continuous strand 36 which is disposed between adjacent strand segments 38. Thus, the strand segments 38 are not generally present in each of the second sections 34. Each of the second sections 34 extends along the predetermined path 28 according to the gap length $L_g$ defined respectively between adjacent strand segments 38.

In instances, where the strand segments 38 belonging to one of the strand segment groupings 44 have various strand segment lengths $L_{SS}$, such as shown in FIG. 4, the second portion 58 may be defined according to the gap length $L_g$ corresponding to a shortest or a longest length between adjacent strand segments 38.

Each of the first sections 32 has a first section electrical resistance defined along the predetermined path 28. The first section electrical resistance is generally defined with respect to the combination of one of the first portions 56 of the continuous strand 36 extending along one of the strand segment lengths $L_{SS}$ as well as the respective strand segment or segments 38 which are electrically connected to the same one of the first portions 56. In one embodiment, the first section electrical resistance is approximately 1 Ohm/meter. The first section electrical resistance may be substantially similar for each of the first sections 32 of the heating element 26. Alternatively, the first section electrical resistance of one of the first sections 32 may be slightly different than the first section electrical resistance of another one of the first sections 32.

Each of the second sections 34 has a second section electrical resistance defined along the predetermined path 28. The second section electrical resistance is generally defined with respect to the second portion 58 of the continuous strand 36 which is extending across one of the gap lengths $L_g$. The second section electrical resistance is greater than the first section electrical resistance. Mainly, the amount of conductive material is effectively reduced at each of the second sections 34 thereby increasing the electrical resistance at the second portion 58. In effect, the electrical power supplied through the heating element 26 concentrates through the second portion 58 of the continuous strand 36. In one embodiment, the second section electrical resistance is approximately 10 Ohm/meter such that the second section electrical resistance is ten times higher than the first electrical resistance. However, the second section electrical resistance may be greater than the first electrical resistance according to other suitable ratios or amounts without departing from the scope of the invention. The second section electrical resistance may be substantially similar for each of the second sections 34 of the heating element 26. Alternatively, the second section electrical resistance of one of the second sections 34 may be slightly different than the second section electrical resistance of another one of the second sections 34.

As shown in FIG. 1A, each of the first sections 32 defines a first heating area 60 on at least one of the bottom and back seating surfaces 16, 18. Each of the first heating areas 60 emanates from each the first sections 32. More specifically, the first heating areas 60 emanate from the combination of the first portion 56 of the continuous strand 36 and the strand segments 38 of each respective first section 32. As shown in FIG. 1A, the first heating area 60 may be substantially similar for each of the first sections 32 of the heating element 26. Alternatively, the first heating area 60 of one of the first sections 32 may be different than the first heating area 60 of another one of the first sections 32.

Each of the second sections 34 defines a second heating area 62 on at least one of the bottom and back seating surfaces 16, 18. The second heating area 62 emanates from each the second sections 34. More specifically, the second heating area 62 emanates from the second portion 58 of the continuous strand 36 of each respective second section 34. As shown in FIG. 1A, the second heating area 62 may be substantially similar for each of the second sections 34 of the heating element 26. Alternatively, the second heating area 62 of one of the second sections 34 may be different than the second heating area 62 of another one of the second sections 34.

The second heating area 62 is greater than the first heating area 60. As discussed above, each of the second sections 34 has a relatively higher electrical resistance than each of the first sections 32. Furthermore, each of the second sections 34 provides electrical heating at a relatively higher temperature than each of the first sections 32. In effect, each of the second heating areas 62 extends away from the predetermined path 28 of the heating element 26. In other words, each of the second heating areas 62 generally heat a region of the zone 20 which is substantially occupied by the respective second section 34 of the heating element 26 in addition to an adjacent region of the zone 20 which is substantially unoccupied by the respective second section 34 of the heating element 26. In effect, the second heating areas 62 provide a plurality of "hot points" to the zone 20. In one embodiment, as shown in FIGS. 1 and 1A, each of the second heating areas 62 extend radially from the predetermined path 28 such that each of the second heating areas 62 has a substantially elliptical or circular configuration. Alternatively, each of the second heating areas 62 may extend from the predetermined path 28 according to any other suitable configuration not specifically described herein.

On the other hand, as shown in FIG. 1A, each of the first heating areas 60 substantially follows the predetermined path 28. In other words, each of the first heating areas 60 generally heats a region of the zone 20 which is substantially occupied by the respective first section 32 of the heating element 26. In one embodiment, each of the first heating areas 60 has a linear configuration closely following the predetermined path 28 of the heating element 26.

In one embodiment, as shown in FIG. 1A, the heating element 26 has a first part 64 which extends along the predetermined path 28 and a second part 66 which is disposed adjacent to the first part 64 and which extends along the predetermined path 28. The first and second parts 64, 66 of the heating element 26 are disposed substantially parallel to one another and are connected by a turn 68 in the predetermined path 28. The turn 68 has a substantially U-shaped configuration. As such, the predetermined path 28 generally has a serpentine configuration. A region 70 is defined in the zone 20 between the first and second parts 64, 66 of the heating element 26. Generally, the region 70 is relatively less exposed to electrical heating because the region 70 is spaced from the predetermined path 28 of the heating element 26. In effect, a temperature gap may develop on one of the bottom and back seating surfaces 16, 18 in the region 70 thereby creating a "cold points" in the zone 20 which an occupant of the seat assembly 10 my find uncomfortable. At least one of the second sections 34 is defined along at least one of the first and second parts 64, 66 of the heating element 26 such that the second heating area 62 extends into the region 70. As such, the "hot points" provided by at least one of the second sections 34 effectively concentrates electrical heating at the region 70 between the first and second parts 64, 66 of the heating element 26 to reduce the presence of the "cold points." In effect, the heating element 26 minimizes the temperature gap on one of the bottom and back seating surfaces 16, 18 thereby increasing the comfort of an occupant of the seat assembly 10. Furthermore, the heating element 26 provides electrical heating as effectively as conventional heating elements while consuming less power than conventional heating elements. Power consumption is reduced because the heating element 26 provides variable temperature along the length of the predetermined path 28 and consumes variable amounts of power per unit length. In particular, power consumption is minimized at the first sections 32 of the heating element 26 along the predetermined path 28.

In one embodiment, as shown in FIG. 1A, the plurality of the second sections 34 are arranged and aligned along the first and second parts 64, 66 of the heating element 26 such that the second heating areas 62 substantially align with respect to one another in the region 70. In other words, the second sections 34 are spaced from one another according to predetermined distances such that the second heating areas 62 emanate from approximately the same corresponding location on the first part 64 of the heating element 26 as the second part 66. Alternatively, the second sections 34 may be arranged and aligned along the first and second parts 64, 66 of the heating element 26 according to any other pattern or configuration without departing from the scope of the present invention.

According to another embodiment of the present invention, as shown in FIGS. 6-9, the heating element 26 has a first continuous conductor 136 and a second continuous conductor 137. Each of the first and second continuous conductors 136, 137 extends continually through alternating the first and second sections 32, 34 along the predetermined path 28. It is to be appreciated that each of the first and second continuous conductors 136, 137 of the embodiments shown in FIGS. 6-9 are generally analogous to the continuous strand 36 of the embodiments shown in FIGS. 2-4. In other words, each of the first and second continuous conductors 136, 137 perform substantially the same function in substantially the same way as the continuous strand 36.

The heating element 26 further includes a plurality of first conductor segments 138. Each of the first conductor segments 138 defines a first conductor segment length $L_{cs1}$ and is electrically connected to the first continuous conductor 136. Each of the first conductor segments 138 are disposed adjacent one another in series along the predetermined path 28. The heating element 26 further includes a plurality of second conductor segments 139. Each of the second conductor segments 139 defines a second conductor segment length $L_{cs2}$ and is electrically connected to the second continuous conductor 137. Each of the second conductor segments 139 are disposed adjacent one another in series along the predetermined path 28. The first conductor segment lengths $L_{cs1}$ are substantially aligned with the second conductor segment lengths $L_{cs2}$ along the predetermined path 28.

In this embodiment of the present invention, each of the first sections 32 includes the aligned first and second conductor segments 138, 139. Each of the first sections 32 further includes a first portion 150 of each of the first and second continuous conductors 136, 137 extending along the aligned first and second conductor segment lengths $L_{cs1}$, $L_{cs2}$. Each of the first conductor segments 138 are spaced from an adjacent first conductor segment 138 by a first gap 154. Each first gap 154 defines a first gap length $L_{g1}$. Each of the second conductor segments 139 are spaced from an adjacent second conductor 139 segment by a second gap 156. Each of the second gaps 156 defines a second gap length $L_{g2}$. The first gap lengths $L_{g1}$ are substantially aligned with the second gap lengths $L_{g2}$ along the predetermined path 28. Each of the second sections 34 includes a second portion 158 of each of the first and second continuous conductors 136,137 extending across each of the aligned first and second gap lengths $L_{g1}$, $L_{g2}$.

According to one embodiment, the first continuous conductor 136 and the first conductor segments 138 are electrically connected in parallel to the second continuous conductor 137 and the second conductor segments 139. As shown in FIG. 7, the heating element 26 includes a first insulation layer 160 substantially surrounding the first continuous conductor 136 and the first conductor segments 138. The heating element 26 may further include a second insulation layer 162 substantially surrounding the second continuous conductor 137 and the second conductor segments 139. The first and second insulation layers 160, 162 electrically isolate the first continuous conductor 136 and the respective first conductor segments 138 from the second continuous conductor 137 and the respective second conductor segments 139 along the predetermined path 28. In effect, the first and second insulation layers 160, 162 enable the heating element 26 to provide the "hot points" at controlled positions without disruption as a result of electrical contact between the first and second conductors 136, 137 and/or the first and second conductor segments 138, 139 along the predetermined path 28. Furthermore, any suitable jacket or sheath may be employed to surround both the first and second insulation layers 160, 162.

Figure 8:
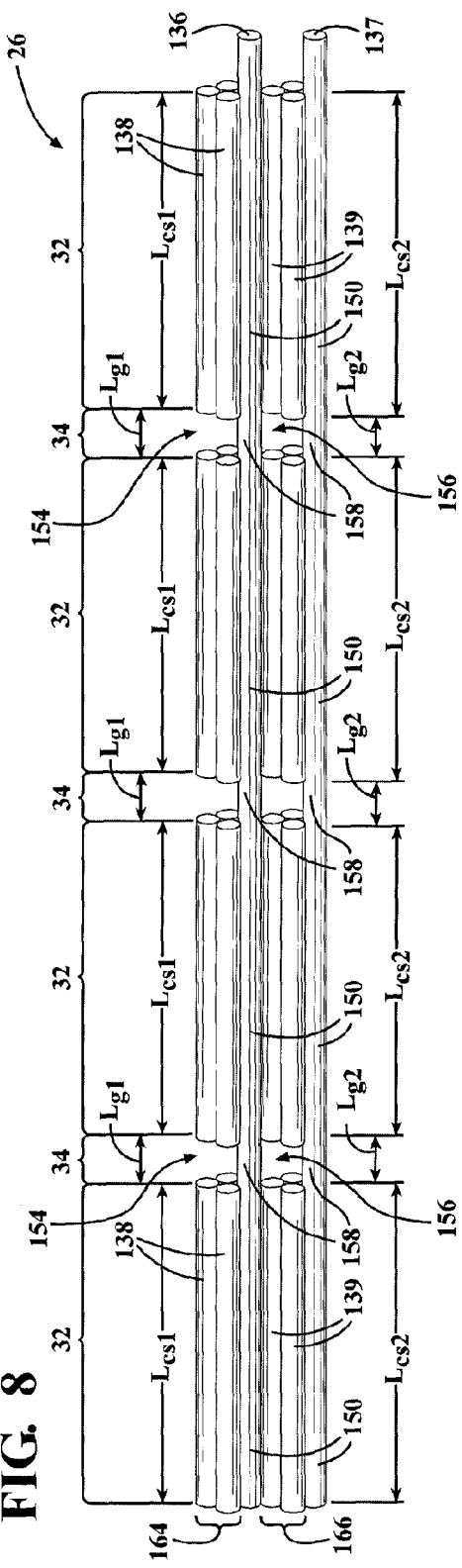
FIG. 8 is an enlarged perspective view of a heating element having a first continuous strand with first strand segments and a second continuous strand with second strand segments which are aligned with the first strand segments, with the first and second strand segments having constant lengths and being spaced by constant gaps according to one embodiment of the present invention.
Figure 9:
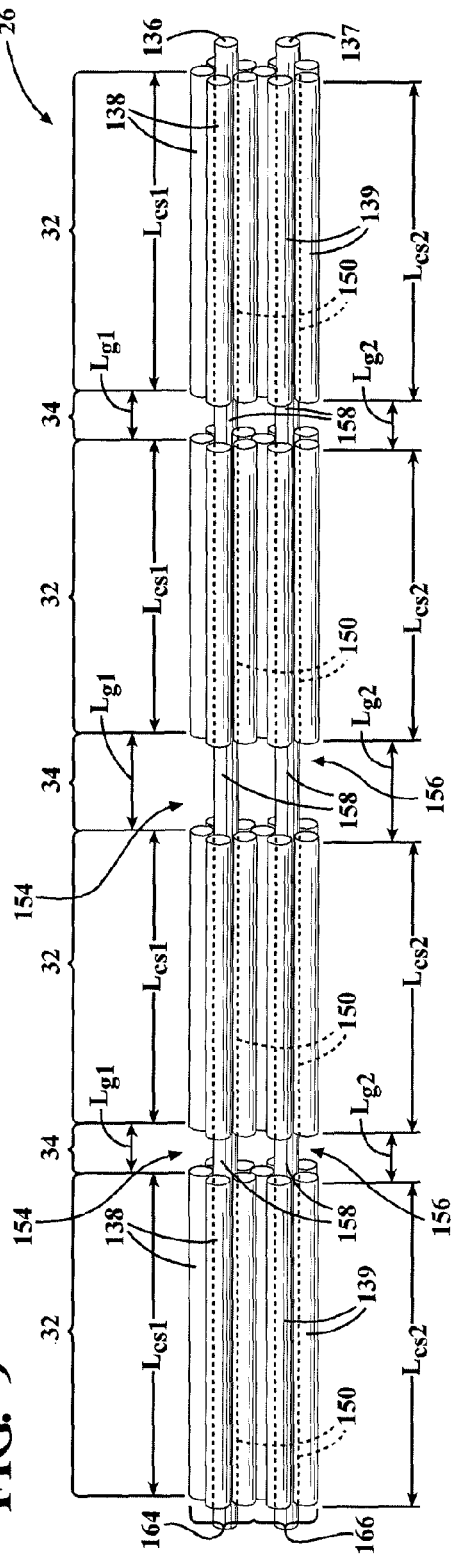
FIG. 9 is an enlarged perspective view of a heating element with the aligned first and second strand segments having varying lengths and being spaced by varying gaps according to yet another embodiment of the present invention.

As shown in FIGS. 6 and 8, each of the aligned first and second conductor segment lengths $L_{cs1}$, $L_{cs2}$ may be substantially constant along the predetermined path 28. Alternatively, as shown in FIGS. 7 and 9, at least one of the aligned first and second conductor segment lengths $L_{cs1}$, $L_{cs2}$ may be different than another one of the aligned first and second conductor segment lengths Lcs1, $L_{cs2}$ along the predetermined path 28.

Furthermore, as shown in FIGS. 6 and 8, each of the aligned first and second gap lengths $L_{g1}$, $L_{g2}$ may be substantially constant along the predetermined path 28. Alternatively, as shown in FIGS. 7 and 9, at least one of the aligned first and second gap lengths $L_{g1}$, $L_{g2}$ may be different than another one of the aligned first and second gap lengths $L_{g1}$, $L_{g2}$ along the predetermined path 28. Preferably, each of the aligned first and second gap lengths $L_{g1}$, $L_{g2}$ is defined in a range between 1 mm to 5 mm.

Just as with the embodiment shown in FIGS. 2-5, each of the first sections 32 has a first electrical resistance defined along the predetermined path 28 and each of the second sections 34 has a second electrical resistance defined along the predetermined path 28. The second electrical resistance is greater than the first electrical resistance. Similarly, each of the first sections 32 defines a first heating area 60 on at least one of the bottom and back seating surfaces 16, 18. Each of the second sections 34 defines a second heating area 62 on at least one of the bottom and back seating surfaces 16, 18. The second heating area 62 is greater than the first heating area 60. Similarly, at least one of the second sections 34 may be defined along at least one of the first and second parts 64, 66 of the heating element 26 such that the second heating area 62 extends into the region 70, as shown in FIG. 1A.

In one embodiment, the first continuous conductor 136 has a first conductor electrical resistance defined along the predetermined path 28 and each of the plurality of first conductor segments 138 has a first conductor segment electrical resistance defined along the predetermined path 28. The first conductor electrical resistance is greater than the first conductor segment electrical resistance. Similarly, the second continuous conductor 137 has a second conductor electrical resistance defined along the predetermined path 28 and each of the plurality of second conductor segments 139 has a second conductor segment electrical resistance defined along the predetermined path 28. The second continuous conductor electrical resistance is greater than the second conductor segment electrical resistance.

According to one embodiment, as shown in FIGS. 6 and 7, the first and second continuous conductors 136, 137 are each further defined as a core and each of the plurality of first and second conductor segments 138, 139 are further defined as a plating segment each of which substantially surrounds a respective one of the first and second continuous conductors 136, 137. In this embodiment, each of the plurality of first and second conductor segments 138, 139 has a tube configuration with a substantially constant thickness. Each of the first gaps 154 is defined radially with respect to the first continuous conductor 136 and each of the second gaps 156 is defined radially with respect to the second continuous conductor 137. In one embodiment, as shown in FIGS. 6 and 7, the first and second gaps 154, 156 define a ring configuration. Alternatively, the first and second gaps 154, 156 may define other radial configurations, such as a quarter-circle or half-circle configuration. Furthermore, the first and second gaps 154, 156 may be formed according to any suitable method, such as slicing away portions of the first and second conductor segments 138, 139. Additionally, the plurality of first and second conductor segments 138, 139 in this embodiment may be formed of any suitable conductive plating material, such as gold or silver.

According to another embodiment, as shown in FIGS. 8 and 9, the first and second continuous conductors 136, 137 are each further defined as a continuous strand and each of the plurality of first and second conductor segments 138, 139 are further defined as a strand segment. The heating element 26 in the embodiment of FIGS. 8 and 9 effectively incorporates a combination of two or more heating elements 26 as shown in FIGS. 2-4. Thus, the various aspects, characteristics, and alternative configurations of the heating element 26 as shown in FIGS. 2-4 which are described herein may be fully utilized in the heating element 26 of the embodiment shown in FIGS. 8 and 9. In this embodiment, the first conductor segments 138 are arranged in first conductor segment groupings 164 and the second conductor segments 139 are arranged in second conductor segment groupings 166. Each of the first conductor segment groupings 164 has common number of first conductor segments 138 and each of the second conductor segment groupings 166 has a common number of second conductor segments 139. Each of the first and second conductor segment groupings 164, 166 generally has a cross-sectional area defining a periphery. In one embodiment, as shown in FIG. 8, the first continuous conductor 136 is disposed at the periphery of the cross-sectional area of the first conductor segment groupings 164 and the second continuous conductor 137 is disposed at the periphery of the cross-sectional area of the second conductor segment groupings 166. Alternatively, as shown in FIG. 9, both the first and second continuous conductors 136, 137 are disposed within the periphery of the cross-sectional areas of the respective first and second conductor segment groupings 164, 166.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat assembly comprising:
   a seat bottom having a bottom seating surface;
   a seat back coupled to said seat bottom with said seat back having a back seating surface and with at least one of said bottom seating surface and said back seating surface having a zone which is temperature controlled;
   a heating element disposed along a predetermined path in said zone with said heating element configured to provide electrical heating of variable temperature to said zone along said predetermined path, said heating element comprising;
      first and second sections continuously alternating along said predetermined path with each of said first sections providing electrical heating to said zone at a first temperature and with each of said second sections providing electrical heating to said zone at a second temperature with said second temperature being greater than said first temperature;
      a continuous strand which extends continually through each of said alternating first and second sections along said predetermined path;
      a plurality of strand segments each defining a strand segment length and each being electrically connected to said continuous strand and disposed adjacent one another in series along said predetermined path such that each of said first sections includes one of said strand segments and a first portion of said continuous strand extending along said strand segment length; and
      each of said strand segments being spaced from an adjacent strand segment by a gap defining a gap length with said continuous strand extending across each of said gaps such that each of said second sections includes a second portion of said continuous strand extending across each of said gap lengths.

2. The seat assembly of claim 1 wherein said strand segment lengths are substantially constant along said predetermined path.

3. The seat assembly of claim 1 wherein at least one of said strand segment lengths is different than another one of said segment lengths along said predetermined path.

4. The seat assembly of claim 1 wherein each of said first sections includes a common number of said strand segments.

5. The seat assembly of claim 1 wherein each of said strand segments is disposed substantially parallel to said continuous strand and has a first end and a second end wherein said first and second ends of each of said strand segments are spaced from said first and second ends of a respective one of said adjacent strand segments, and wherein said strand segments in at least one of said first sections are arranged in a strand segment grouping having a cross-sectional area defining a periphery.

6. The seat assembly of claim 5 wherein said continuous strand is disposed substantially at said periphery of said cross-sectional area of one of said strand segment groupings.

7. The seat assembly of claim 5 wherein said continuous strand is disposed substantially within said periphery of said cross-sectional area of one of said strand segment groupings.

8. A seat assembly comprising:
   a seat bottom having a bottom seating surface;
   a seat back coupled to said seat bottom with said seat back having a back seating surface and with at least one of said bottom seating surface and said back seating surface having a zone which is temperature controlled;
   a heating element disposed along a predetermined path in said zone with said heating element configured to provide electrical heating of variable temperature to said zone along said predetermined path, said heating element comprising;
      first and second sections continuously alternating along said predetermined path with each of said first sections providing electrical heating to said zone at a first temperature and with each of said second sections providing electrical heating to said zone at a second temperature with said second temperature being greater than said first temperature;
      a first continuous conductor and a second continuous conductor each extending continually through each of said alternating first and second sections along said predetermined path;
      a plurality of first conductor segments each defining a first conductor segment length and each being electrically connected to said first continuous conductor and disposed adjacent one another in series along said predetermined path;
      a plurality of second conductor segments each defining a second conductor segment length and each being electrically connected to said second continuous conductor and disposed adjacent one another in series along said predetermined path;
      said first conductor segment lengths being substantially aligned with said second conductor segment lengths along said predetermined path such that each of said first sections includes said aligned first and second conductor segments and a first portion of each of said first and second continuous conductors extending along said aligned first and second conductor segment lengths;
      each of said first conductor segments being spaced from an adjacent first conductor segment by a first gap defining a first gap length and each of said second conductor segments being spaced from an adjacent second conductor segment by a second gap defining a second gap length; and
      said first gap lengths being substantially aligned with said second gap lengths along said predetermined path, wherein each of said second sections includes a second portion of each of said first and second continuous conductors extending across each of said aligned first and second gap lengths.

9. The seat assembly of claim 8 wherein each of said aligned first and second gap lengths are substantially constant along said predetermined path.

10. The seat assembly of claim 8 wherein at least one of said aligned first and second gap lengths is different than another one of said aligned first and second gap lengths along said predetermined path.

11. The seat assembly of claim 8 wherein each of said aligned first and second gap lengths is defined in a range between 1 mm to 5 mm.

12. The seat assembly of claim 8 wherein each of said aligned first and second conductor segment lengths are substantially constant along said predetermined path.

13. The seat assembly of claim 8 wherein at least one of said aligned first and second conductor segment lengths is different than another one of said aligned first and second conductor segment lengths along said predetermined path.

14. The seat assembly of claim 8 wherein said first continuous conductor and said first conductor segments are electrically connected in parallel to said second continuous conductor and said second conductor segments, and wherein said heating element comprises a first insulation layer substantially surrounding said first continuous conductor and said first conductor segments and a second insulation layer substantially surrounding said second continuous conductor and said second conductor segments such that said first and second insulation layers electrically isolate said first continuous conductor and said first conductor segments from said second continuous conductor and said second conductor segments along said predetermined path.

15. The seat assembly of claim 8 wherein each of said first and second continuous conductors are further defined as a core and each of said plurality of first and second conductor segments are further defined as a plating segment substantially surrounding a respective one of said first and second continuous conductors and having a tube configuration with a substantially constant thickness, and wherein each of said first gaps is defined radially with respect to said first continuous conductor and wherein each of said second gaps is defined radially with respect to said second continuous conductor.

16. The seat assembly of claim 8 wherein said first and second continuous conductors are each further defined as a continuous strand and each of said plurality of first and second conductor segments are further defined as a strand segment, wherein said first conductor segments are arranged in first conductor segment groupings and wherein said second conductor segments are arranged in a second conductor segment groupings, with each of said first conductor segment groupings having a common number of first conductor segments and each of said second conductor segment groupings having a common number of second conductor segments.

17. An assembly comprising:
a vehicular component having at least one zone which is temperature controlled;
a heating element mounted to said vehicular component and disposed along a predetermined path in said zone with said heating element configured to provide electrical heating of variable temperature to said zone along said predetermined path, said heating element comprising;
first and second sections continuously alternating along said predetermined path with each of said first sections providing electrical heating to said zone at a first temperature and with each of said second sections providing electrical heating to said zone at a second temperature with said second temperature being greater than said first temperature;
a continuous conductor which extends continually through each of said alternating first and second sections along said predetermined path;
a plurality of conductor segments each defining a conductor segment length and each being electrically connected to said continuous conductor and disposed adjacent one another in series along said predetermined path such that each of said first sections includes one of said conductor segments and a first portion of said continuous conductor extending along said conductor segment length; and
each of said conductor segments being spaced from an adjacent conductor segment by a gap defining a gap length with said continuous conductor extending across each of said gaps such that each of said second sections includes a second portion of said continuous conductor extending across each of said gap lengths.

18. The assembly of claim 17 wherein said vehicular component is further defined as a seat assembly including a seat bottom having a bottom seating surface and a seat back coupled to said seat bottom with said seat back having a back seating surface and with at least one of said bottom seating surface and said back seating surface having said zone, wherein each of said first sections defines a first heating area on at least one of said bottom and back seating surfaces and each of said second sections defines a second heating area on at least one of said bottom and back seating surfaces wherein said second heating area is greater than said first heating area.

19. The assembly of claim 17 wherein said heating element has a first part extending along said predetermined path and a second part disposed adjacent said first part and extending along said predetermined path wherein said first and second parts of said heating element are disposed substantially parallel to one another and connected by a turn in said predetermined path with said turn having a substantially U-shaped configuration, and with a region being defined in said zone between said first and second parts, wherein at least one of said second sections is defined along at least one of said first and second parts of said heating element such that said second heating area extends into said region.

20. The assembly of claim 17 wherein each of said first sections has a first section electrical resistance defined along said predetermined path and each of said second sections has a second section electrical resistance defined along said predetermined path wherein said second section electrical resistance is greater than said first section electrical resistance.

21. The assembly of claim 17 wherein said gap lengths are substantially constant along said predetermined path.

22. The assembly of claim 17 wherein at least one of said gap lengths is different than another one of said gap lengths along said predetermined path.

23. The assembly of claim 17 wherein each of said gap lengths is defined in a range between 1 mm to 5 mm.

24. The assembly of claim 17 wherein said first temperature is further defined as being within a first temperature range having a first range minimum and a first range maximum and said second temperature is further defined as being within a second temperature range having a second range minimum and a second range maximum wherein said second range minimum is greater than said first range maximum.

25. The assembly of claim 17 further comprising a power source connected to said heating element for providing power to said heating element such that said heating element provides said electrical heating of variable temperature.

* * * * *